(12) United States Patent
Gavade et al.

(10) Patent No.: US 9,037,971 B2
(45) Date of Patent: May 19, 2015

(54) SECONDARY AUDIO CONTENT BY USERS

(75) Inventors: Sameer Vasant Gavade, Irving, TX (US); Venkata S. Adimatyam, Irving, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 340 days.

(21) Appl. No.: 12/882,737

(22) Filed: Sep. 15, 2010

(65) Prior Publication Data
US 2012/0066594 A1   Mar. 15, 2012

(51) Int. Cl.
| | |
|---|---|
| H04N 21/81 | (2011.01) |
| H04N 21/485 | (2011.01) |
| H04N 21/475 | (2011.01) |
| H04N 21/422 | (2011.01) |
| H04N 21/431 | (2011.01) |
| H04N 21/2743 | (2011.01) |
| H04N 21/8547 | (2011.01) |
| H04N 21/4722 | (2011.01) |
| H04N 21/2368 | (2011.01) |
| G06F 3/0482 | (2013.01) |

(52) U.S. Cl.
CPC ....... *H04N 21/4316* (2013.01); *H04N 21/8547* (2013.01); *G06F 3/0482* (2013.01); *H04N 21/2368* (2013.01); *H04N 21/4722* (2013.01); *H04N 21/2743* (2013.01); *H04N 21/42203* (2013.01); *H04N 21/4756* (2013.01); *H04N 21/4852* (2013.01); *H04N 21/8106* (2013.01)

(58) Field of Classification Search
CPC .......... H04N 21/8547; H04N 21/4722; H04N 21/2368; G06F 3/0482
USPC ............ 715/716, 810; 348/563, 565; 386/338
See application file for complete search history.

(56) References Cited

U.S. PATENT DOCUMENTS

| | | | | |
|---|---|---|---|---|
| 6,311,161 | B1 * | 10/2001 | Anderson et al. | 704/500 |
| 6,630,963 | B1 * | 10/2003 | Billmaier | 348/485 |
| 2004/0268400 | A1 * | 12/2004 | Barde et al. | 725/94 |
| 2006/0174313 | A1 * | 8/2006 | Ducheneaut et al. | 725/135 |
| 2007/0283380 | A1 * | 12/2007 | Aoki et al. | 725/32 |
| 2008/0028023 | A1 * | 1/2008 | Locke | 709/203 |
| 2008/0043089 | A1 * | 2/2008 | Auerbach et al. | 348/14.1 |
| 2008/0124056 | A1 * | 5/2008 | Concotelli | 386/124 |
| 2008/0244672 | A1 * | 10/2008 | Piccionelli et al. | 725/110 |
| 2008/0320545 | A1 * | 12/2008 | Schwartz | 725/135 |
| 2009/0055538 | A1 * | 2/2009 | Conradt et al. | 709/227 |
| 2009/0199230 | A1 * | 8/2009 | Kumar et al. | 725/32 |
| 2010/0098267 | A1 * | 4/2010 | Kosinski et al. | 381/107 |
| 2010/0254674 | A1 * | 10/2010 | Prestenback et al. | 386/95 |
| 2011/0066942 | A1 * | 3/2011 | Barton et al. | 715/716 |
| 2011/0072147 | A1 * | 3/2011 | Kirksey | 709/231 |
| 2011/0113332 | A1 * | 5/2011 | Roberts et al. | 715/716 |

* cited by examiner

Primary Examiner — Nicholas Ulrich

(57) ABSTRACT

A method comprising displaying the list of content on a display and receiving a selection for a first content including a first video content and a first audio content. The method may include displaying a menu of a plurality of additional audio content on the display, wherein displaying the menu of the plurality of additional audio content includes displaying a rating of each of the plurality of additional audio content based on ratings provided by users of each of the plurality of additional audio content. The method may also include receiving a selection of one of the plurality of additional audio content and playing the first content while simultaneously playing the selected one of the plurality of additional audio content.

22 Claims, 12 Drawing Sheets

SECONDARY AUDIO CONTENT BY USERS

BACKGROUND INFORMATION

Television viewers have access to an ever-growing amount and variety of content. For example, a viewer may choose between broadcast television programs, pay-per-view programs, on-demand programs, interactive games, music, etc. This content, in some instances, may come with secondary audio tracks, such as a foreign-language audio track or a director's commentary.

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

Figure 1A:
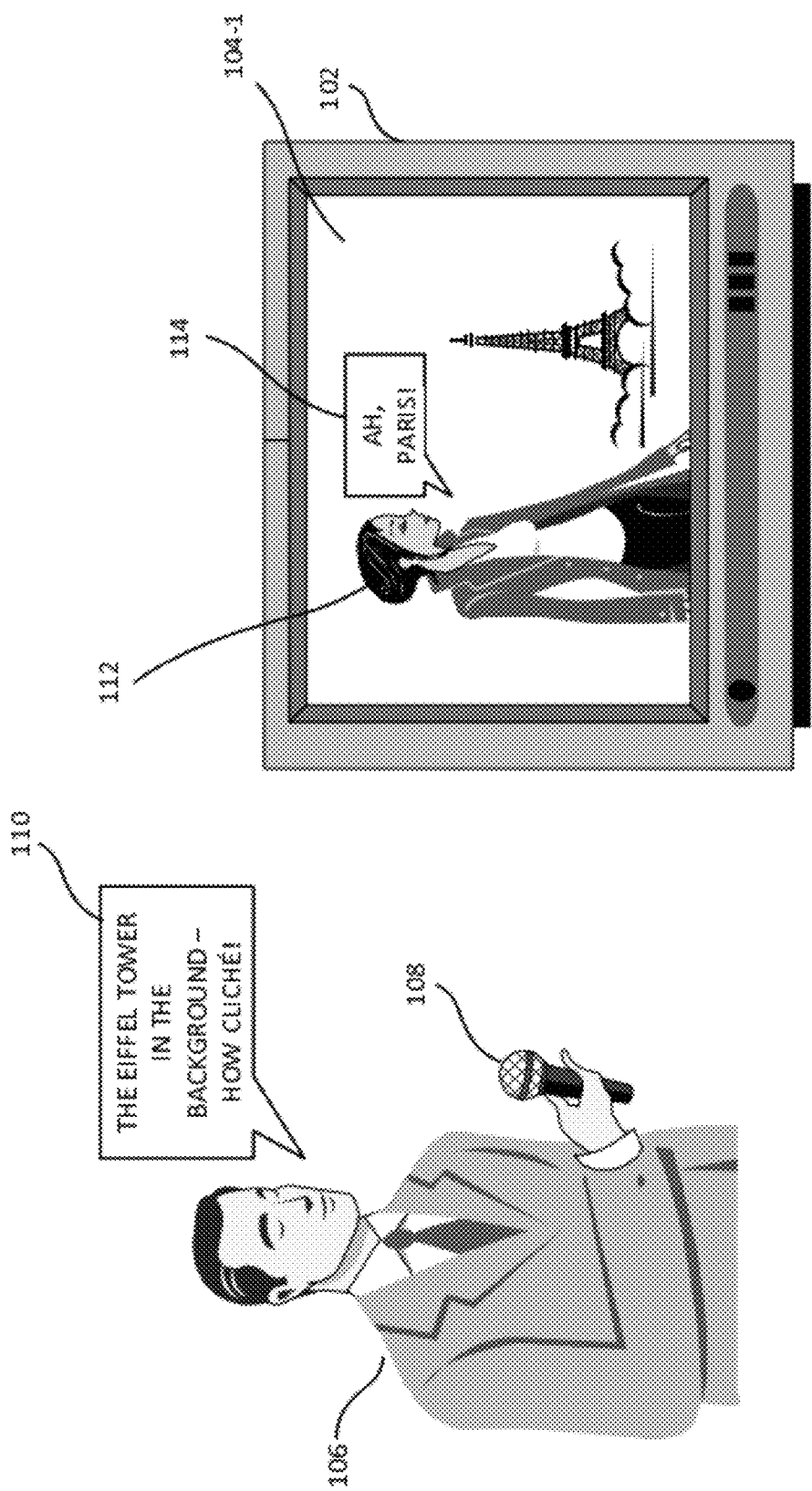
FIGS. 1A and 1B are diagrams of an overview of an exemplary embodiment.
Figure 1B:
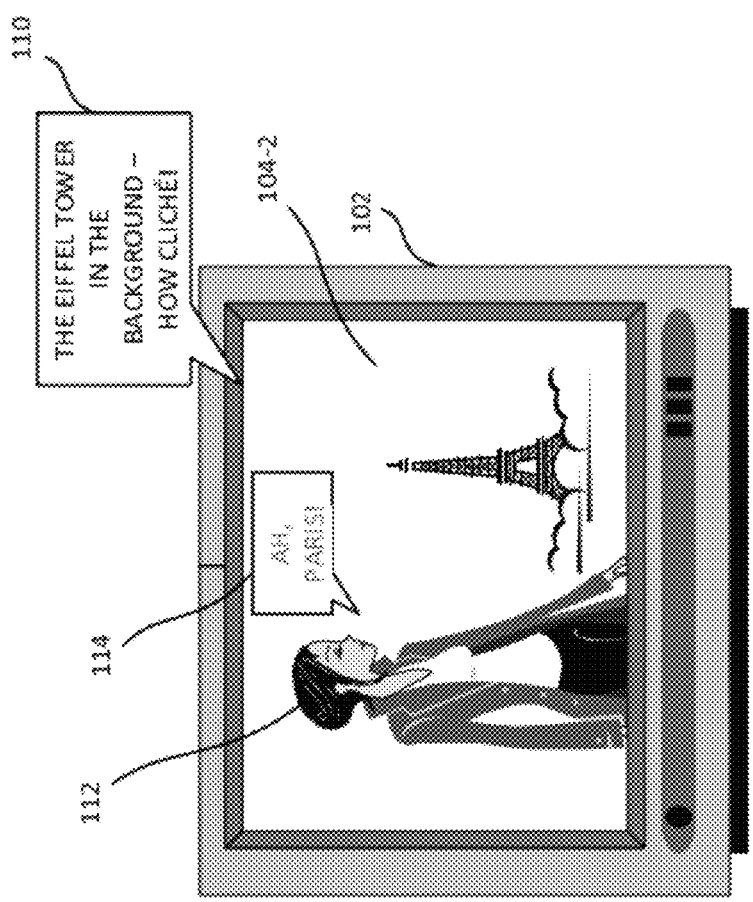

Typically, when content (e.g., a movie) is delivered to a viewer, the viewer cannot to insert his own commentary or audio tracks into the content for sharing with other viewers. Embodiments described below may allow a user to substitute his own commentary in movies, for example, in place of or in addition to the original audio in the movie. FIGS. 1A and 1B provide an example in which John 106, a user and aspiring movie critic, adds his own audio commentary to a movie. In this example, John 106 views an original movie 104-1 on a television (TV) 102. One scene of original movie 104-1 includes an actor 112 in front of background scenery that includes the Eiffel tower. As shown in FIG. 1A, original audio content 114 includes actor 112 saying, "Ah, Paris!"

John 106 wants to add his own commentary to original movie 104-1. Using a microphone 108, John captures audio 110 of himself commenting on original content 104-1. As shown, while watching original movie 104-1, John's commentary includes, "The Eiffel tower in the background—how cliché!" John 106 then uploads the captured audio 110 to a server (not shown) that mixes the original movie 104-1 (and original audio content 114) with the captured audio 110. In doing so, the server may supplement the audio in original content 104-1 with the captured audio 110 or may replace original audio content 114 with captured content 110.

As a result, as shown in FIG. 1B, the server generates a new movie 104-2 (e.g., "mixed" content) that includes content from original movie 104-1 (e.g., the Eiffel tower and original audio 114) and John's captured audio 110 commentary. In this example, captured audio 110 may be considered "user commentary" or a secondary audio track in new movie 104-2. John may share new movie 104-2 with other viewers who may add additional audio commentary, provide written comments, or vote on new movie 104-2 and/or John's performance as a commentator.

Figure 2:
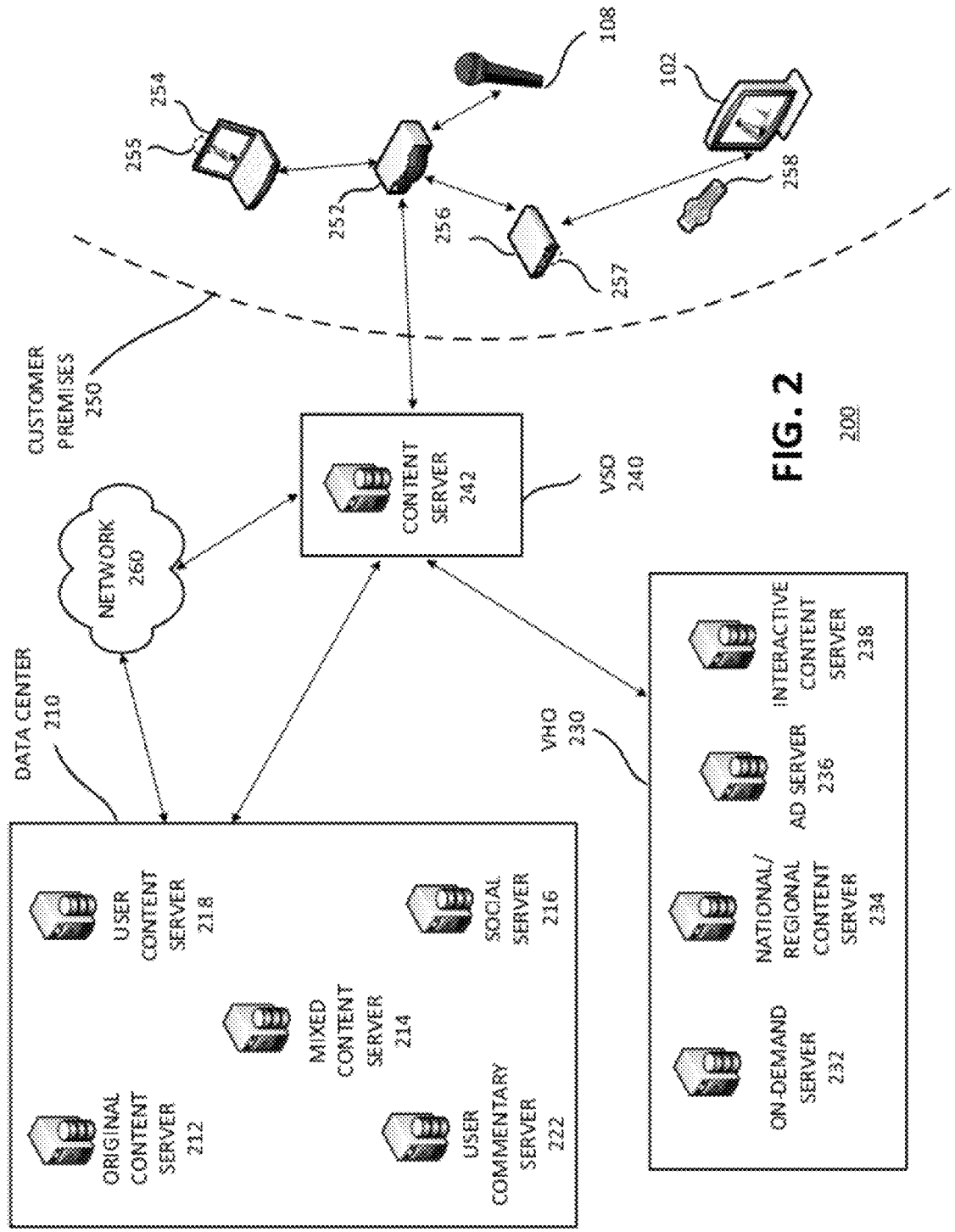
FIG. 2 is a diagram of an exemplary network for implementing different embodiments.

FIG. 2 is a diagram of an exemplary network 200 for implementing the embodiment of FIG. 1 and other embodiments. Network 200 may include a data center 210, a video hub office (VHO) 230, a video service office (VSO) 240, customer premises 250, and a network 260. Customer premises 250 (e.g., the customer's home) may include TV 102, microphone 108, an optical network terminal (ONT) 252, a set-top box (STB) 256, a computer 254, and a remote control 258. ONT 252 may receive data, e.g., on a fiber optic cable, and may transfer the data to the appropriate device in customer premises 250, such as computer 254 or STB 256. Likewise, ONT 252 may receive data from any device in customer premises 250 and may transmit the data to other devices in network 200, e.g., through a fiber optic cable.

STB 256 may receive content through content server 242, for example, and output the content to TV 102 for display. STB 256 may include a component (e.g., a cable card or a software package) that plugs into a host device (e.g., a personal computer, TV 102, a stereo system, etc.) that allows the host device to display content. STB 256 may also be implemented as a home theater personal computer (HTPC), an optical disk player (e.g., digital video disk (DVD) or Blu-Ray™ disc player), a cable card, etc. STB 256 may receive commands from other components in network 200 (e.g., remote control 258).

TV 102 may include speakers as well as a display. TV 102 may play content, for example, received through VSO 240. While some embodiments described below may use TV 102, other embodiments may play content using any device (e.g., computer 254 or a mobile phone) capable of receiving and displaying content.

Remote control 258 may issue wired or wireless commands for controlling other electronic devices, such as TV 102 or STB 256. Remote control 258, in conjunction with STB 256, may allow a user to manually select and play content (e.g., mixed or original content) for viewing on TV 102. Remote control 258 may also be used in conjunction with STB 256 to record audio and/or video for mixing with original content. Other types of devices (e.g., a keyboard, mouse, mobile phone, etc.) may be used instead of remote control 258.

Microphone 108 may capture audio of users to generate user content (e.g., user content 110). The audio may include critical commentary, language translations, etc. The user content may be mixed with original content to generate mixed content. As discussed below, microphone 108 may be incorporated into TV 102, STB 256, or computer 254, for example.

In one embodiment, microphone 108 may include noise-canceling and/or echo suppression circuitry. In this embodiment, the commentator may not have to isolate the original audio that is playing from microphone 108. That is, microphone 108, aware of original audio 114, may subtract out original audio 114 from received audio, leaving commentary 110. In one embodiment, microphone 108 may also include circuitry that time stamps commentary 110 relative to original audio 114 so that commentary server 222 may mix the user-generated content and original content in a synchronized manner. In one embodiment, original audio 114 may be subtracted out of the received audio signal by commentary server 222.

Microphone 108 may also complement a camera (not shown) for capturing images and/or video as part of user content for mixing with original content. For example, a picture-in-picture (PIP) video of a user-critic may be placed in one corner of the original content.

Computer 254 may include a laptop, a desktop, a mobile telephone, a personal digital assistant (PDA), or another portable communication device. Computer 254 may include a microphone 255 for capturing audio of users to generate user content for mixing with original content. Microphone 255 may function similarly to microphone 108 described above. Computer 254 may also include a camera for capturing images and/or video as part of user content for mixing with original content.

Customer premises 250 may connect to VSO 240. VSO 240 may collect and deliver content to customer premises 250 and may receive data from customer premises 250 (e.g., user content) for forwarding to the proper destination (e.g., data center 210). VSO 240 may include a content server 242. Content server 242 may include a content multiplexer to select content, such as mixed content, on-demand content, regional or national content, interactive content, and/or advertising content, and multiplex the information together. Content server 242 may also perform transcoding, encoding, decoding, or encryption functions.

Data center 210 may include one or more servers that manage and/or store information associated with providing user-commentator (UC) services (e.g., receiving user commentary and mixing the user commentary with original content). As shown in FIG. 2, data center 210 may include an original content database (DB) 212, a mixed content server 214, a social server 216, a user content server 218, and/or a user commentary server 222.

Original content server 212 may include a database and/or server to store content (e.g., "original content" such as video and audio content) into which users may insert secondary audio of themselves, such as viewer commentary. In one embodiment, original content may include original audio that may be replaced or supplemented with audio provided by users or viewers. Original content server 212 may store a metadata database that describes content stored in original content server 212. For example, for a movie, the metadata database may store the title, genre, plot, director, cast, etc., of the movie. Metadata storing information about content may include extended-markup-language data in the ScreenplayXML format, for example.

User content server 218 may include a server and/or database that stores content provided by users, such as audio commentary or other secondary audio tracks. For example, a user may upload audio of himself commenting on a movie. In one embodiment, user content may also include audio of the user reading lines of the script of the original content in, for example, a different language. User content server 218 may store a metadata database that describes content stored in user content server 218. For example, the metadata database may store information linking the commentary provided by a user to the original content. As another example, the metadata may include timing information to properly sync the commentary with the original content.

Mixed content server 214 may include a server and/or database for storing mixed content (e.g., original content mixed with user content). Mixed content may be generated by logic to mix original content with user content. Mixed content server 214 may store a metadata database that describes content stored in mixed content server 214. For mixed content, the metadata database may store the title, genre, plot, and user-as-commentator name.

Social server 216 may include a database and/or server that stores information about user preferences, preferences of a group of users, or other information. Social server 216 may associate user content stored in user content server 218 with the corresponding user. Social server 216 may associate groups of people who may follow each other's commentary, for example. Social server 216 may also store a contact list of other users associated with a particular user (e.g., "friends," "followers," etc.).

Commentary server 222 may allow a user to browse original content for selecting original content for applying the user-as-commentator services. Commentary server 222 may also allow a user to view mixed content and, in one embodiment, allow social features. For example, a user viewing mixed content may vote or rank a user's commentary in mixed content. As another example, a user viewing mixed content may recommend the mixed content to another user. In one embodiment, commentary server 222 may ask the user-commentator whether the secondary audio should supplement the original audio or entirely replace the original audio. In the former case, commentary server 222 may ask the user-commentator the desired volume level of the original audio.

Commentary server 222 may also include mixing logic to mix original content and user content to generate mixed content. The mixing logic may use the metadata describing original content and metadata describing user content to determine parts of the original content (e.g., in time) for replacement or supplementation with the user content.

VHO 230 may include an on-demand server 232, a national/regional content server 234, an advertisement (ad) server 236, and an interactive content server 238. Regional/national content server 234 may provide television broadcasts (e.g., local broadcasts, such as NBC, CBS, ABC, Fox, local cable access channels, etc.). Regional/national content server 234 may also include for-pay television broadcasts (e.g., TNT, ESPN, HBO, Cinemax, CNN, etc.). On-demand server 232 may provide on-demand content. Ad server 236 may provide and/or manage the advertising content (e.g., commercials) that is presented with other content. Interactive content server 238 may serve and manage interactive content (e.g., a form of content with which a user can interact).

Network 260 may include one or more packet switched networks, such as an Internet protocol (IP) based network, a local area network (LAN), a wide area network (WAN), a personal area network (PAN), an intranet, the Internet, or another type of network that is capable of transmitting data. Network 260 may include a circuit-switched network, such as a public-switched telephone network (PSTN) for providing telephone services for traditional telephones. Network 260, in conjunction with components in VSO 240, may allow devices at customer premises 250 (e.g., a computer or a set-top box) to connect to other devices also attached to network 260, such as third party web site servers (not shown) or other customers (not shown).

The exemplary configuration of devices in network 200 is illustrated for simplicity. Network 200 may include more devices, fewer devices, or a different configuration of devices than illustrated in FIG. 2. For example, network 200 may include thousands or millions of customer homes. In some embodiments, the functions performed by two or more devices may be performed by any one device. Likewise, in some embodiments, the functions performed by any one device may be performed by multiple devices. Further, the connections shown in FIG. 2 are exemplary. In other embodiments, additional connections that are not shown in FIG. 2 may exist between devices (e.g., each device may be connected to every other device). The connections in FIG. 2 may also be wireless or wired.

Figure 3:
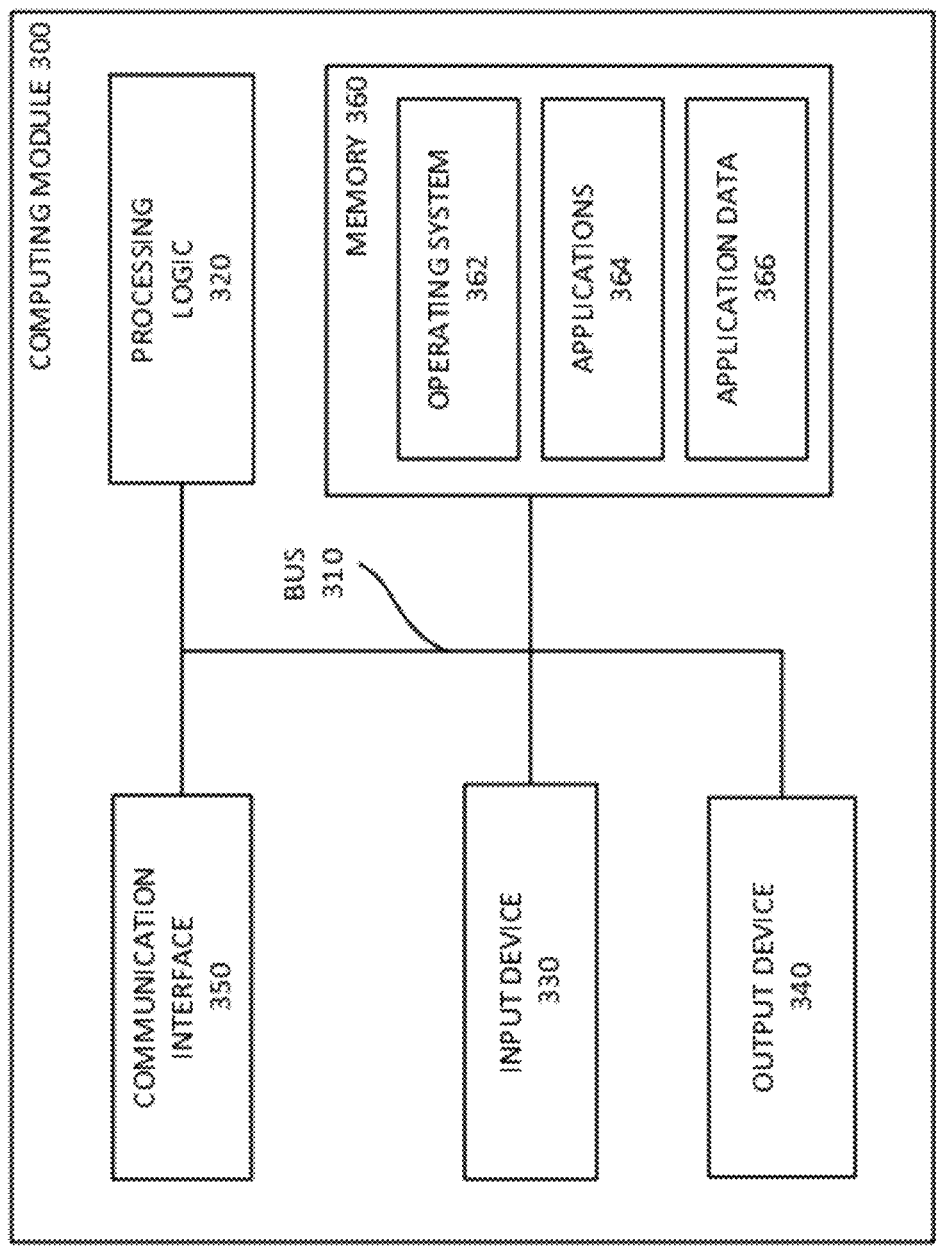
FIG. 3 is a block diagram of exemplary components of a computing module.

Devices in network 200 may each include one or more computing modules. FIG. 3 is a block diagram of exemplary components of a computing module 300. Computing module 300 may include a bus 310, processing logic 320, an input device 330, an output device 340, a communication interface 350, and a memory 360. Computing module 300 may include other components (not shown) that aid in receiving, transmitting, and/or processing data. Moreover, other configurations of components in computing module 300 are possible.

Bus 310 may include a path that permits communication among the components of computing module 300. Processing logic 320 may include any type of processor or microprocessor (or families of processors or microprocessors) that interprets and executes instructions. In other embodiments, processing logic 320 may include an application-specific integrated circuit (ASIC), a field-programmable gate array (FPGA), or the like.

Input device 330 may allow a user to input information into computing module 300. Input device 330 may include a keyboard, a mouse, a pen, a microphone, a remote control (e.g., remote control 258), an audio capture device (e.g., microphone 108), an image and/or video capture device, a touchscreen display, etc. Some devices, such as servers 232-238, may be managed remotely and may not include input device 330. In other words, some devices may be "headless" and may not include a keyboard, for example.

Output device 340 may output information to the user. Output device 340 may include a display, a printer, a speaker, etc. For example, TV 102 includes a display (an output device), which may include a liquid-crystal display (LCD) for displaying content to the user. As another example, ONT 252 and STB 256 may include light-emitting diodes (LEDs). Headless devices, such as servers 232-238, may be managed remotely and may not include output device 340.

Input device 330 and output device 340 may allow the user to activate and interact with a particular service or application, such as UC application. Input device 330 and output device 340 may allow the user to receive and view a menu of options and select from the menu options. The menu may allow the user to select various functions or services associated with applications executed by computing module 300.

Communication interface 350 may include a transceiver that enables computing module 300 to communicate with other devices and/or systems. Communication interface 350 may include a transmitter that may convert baseband signals to radio frequency (RF) signals and/or a receiver that may convert RF signals to baseband signals. Communication interface 350 may be coupled to an antenna for transmitting and receiving RF signals. Communication interface 350 may include a network interface card, e.g., Ethernet card, for wired communications or a wireless network interface (e.g., a WiFi) card for wireless communications. Communication interface 350 may also include, for example, a universal serial bus (USB) port for communications over a cable, a Bluetooth™ wireless interface, an RFID interface, a near-field communications (NFC) wireless interface, etc.

Memory 360 may store, among other things, information and instructions (e.g., applications 364 and operating system (OS) 362) and data (e.g., application data 366) for use by processing logic 320. Memory 360 may include a random access memory (RAM) or another type of dynamic storage device; a read-only memory (ROM) device or another type of static storage device; and/or some other type of magnetic or optical recording medium and its corresponding drive (e.g., a hard disk drive (HDD)).

OS 362 may include software instructions for managing hardware and software resources of computing module 300. For example, OS 362 may include Linux, Windows, OS X, Android, an embedded operating system, etc. Applications 364 and application data 366 may provide network services or include applications, depending on the device in which the particular computing module 300 is found.

Computing module 300 may perform the operations described herein in response to processing logic 320 executing software instructions contained in a computer-readable medium, such as memory 360. A computer-readable medium include a physical or logical memory device. The software instructions may be read into memory 360 from another computer-readable medium or from another device via communication interface 350. The software instructions contained in memory 360 may cause processing logic 320 to perform processes that are described herein.

Figure 4:
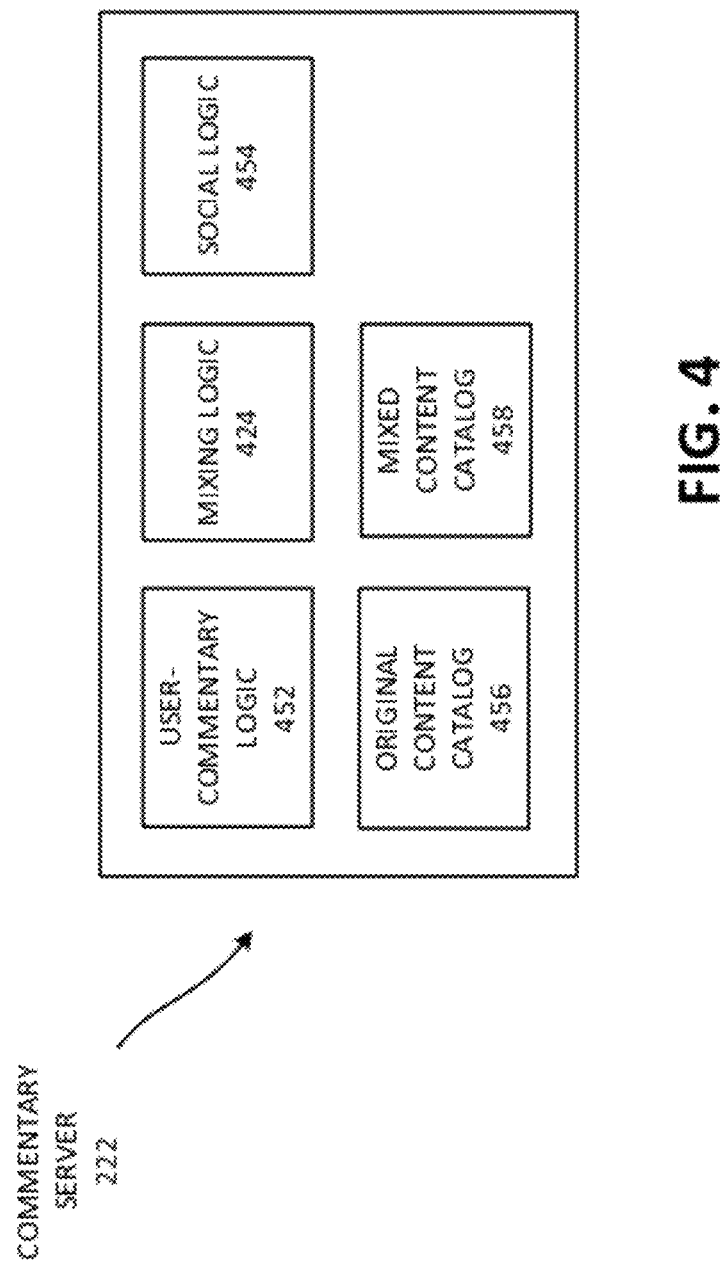
FIG. 4 is a block diagram of exemplary components of the user-commentary server shown in FIG. 2.

As described above, commentary server 222 may provide services to a user to add user commentary or secondary audio tracks to original content. FIG. 4 is a block diagram of exemplary components of commentary server 222 (e.g., functions performed by application 364 in processing logic 320 or stored in memory 360 of mixing logic 424). Commentary server 222 may include user-commentary (UC) logic 452, mixing logic 424, and social logic 454. Commentary server 222 may also include original content catalog 456 and mixed content catalog 458.

Original content catalog 456 may include a listing of original content and may be generated from original content metadata stored in original content server 212, for example. UC logic 452 may provide the listing of original content to, for example, STB 256 for display on TV 102. In response, a user may select original content for UC services. Once selected, commentary server 222 may retrieve the original content for transmittal to and display on TV 102. UC logic 452 may interact with the user to record commentary or secondary audio content that the user may submit to commentary server 222 for UC services. UC logic 452 may store any received user content in user content server 218 and may request the services of mixing logic 424 to mix user content with original content. UC logic may coordinate many different users who are using UC services to comment on the same original content.

Mixing logic 424 may receive and store original content and metadata from original content server 212 and user content and metadata from user content server 218. Mixing logic 424 may insert user content (e.g., user commentary or secondary audio tracks) into original content. For example, mixing logic 424 may replace or supplement the audio of actors in original content with user content, e.g., user audio commentary and/or user-generated secondary audio tracks.

Mixed content catalog 458 may include a listing of mixed content and may be generated from mixed content metadata stored in mixed content server 214. UC logic 452 may provide the listing of mixed content to, for example, STB 256 for display on TV 102. In response, a user may select mixed content to view on TV 102. Once selected, commentary server 222 may retrieve the mixed content for delivery to STB 256 for display on TV 102. Social logic 454 may allow a user to rank mixed content, to vote for a UC, to recommend mixed content to friends, etc.

Figure 5:
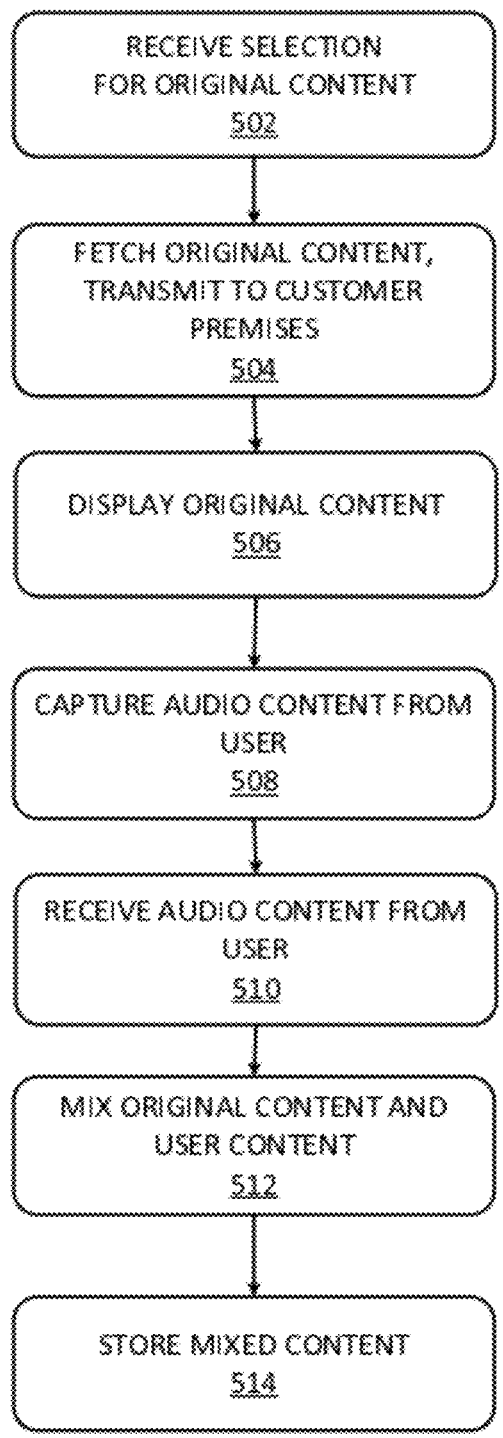
FIG. 5 is a flowchart of an exemplary process for mixing user commentary with generated mixed content.

As discussed above, data center 210 may provide user-commentary services to users in, for example, customer premises 250. FIG. 5 is a flowchart of a process 500 for generating user content for mixing with original content (e.g., substituting user commentary in the place of original audio or to supplement original audio). As with the example of FIG. 1, in this example, the user named John wishes to comment on the original content displayed on TV 102.

In this example, process 500 may begin when commentary server 222 sends a list of original content (e.g., original content catalog 456) to STB 256 for display on TV 102 for the user John to browse. John may use remote control 258 to interact with STB 256 to select and play original content 104-1 (e.g., "Ocean's Twelve") from the list displayed on TV 102. In one embodiment, content with commentary may be highlighted. In this embodiment, content may also be listed with an indication of the commentary (e.g., "with commentary from friend Joe"). A selection for the original content (e.g., "Ocean's Twelve") may be received (block 502) by, for example, commentary server 222. The original content may be fetched from original content server 212 and transmitted to customer premises (block 504). STB 256 may receive the original content for display on TV 102 (block 506). For example, the user may select original content 104-1, which, as shown in FIG. 6 is displayed on TV 102.

Figure 6:
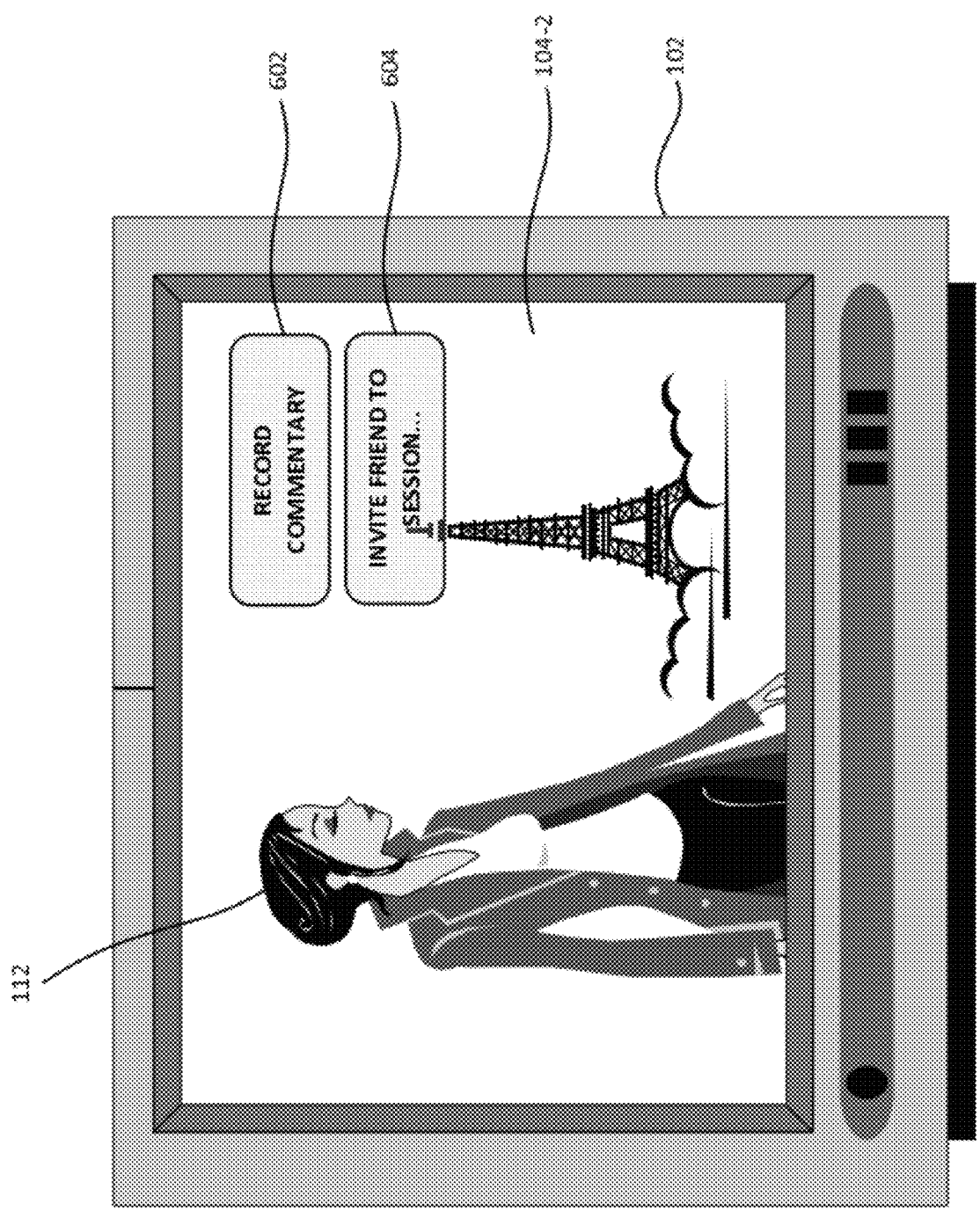
FIG. 6 is a diagram of the television from FIG. 2 showing the option for the user to record commentary.

FIG. 6 is a display of the selected original content 104-1 including a scene with a character and the Eiffel tower in the background. Audio content may be received from the viewer (block 508). For example, the user may select button 602 to begin recording user commentary. As shown in FIG. 1A, John may capture audio content using microphone 108. In other embodiments, John may use microphone 257 built into STB 256 or microphone 255 built into computer 254. In one embodiment, John may invite a friend (e.g., to comment on original content 104-2) by selecting an invite-friend button 604. In this case, the user may be taken to a list of contacts (e.g., stored in social server 216) for inviting to the commentary session. In this embodiment, John and any invited friend may be able to hear and/or see each other and talk to each other while original content 104-2 is playing.

John may send the user content to commentary server 222, which receives the user content (block 510). Mixing logic 424 may mix the original content with the user content (block 512). For example, mixing logic 424 may retrieve audio from John from the user content server 218. Mixing logic 424 may then supplement the audio in original content 104-1 with John's commentary. In this example, the resulting mixed content 104-2 is shown in FIG. 1B, which includes original audio 114 (e.g., with volume reduction) and user commentary 110. As a result, John's commentary may sound as a "voice-over" audio track with respect to original audio 114. In one embodiment, mixing logic 424 may also generate metadata for the mixed content. The metadata for mixed content may include the title, genre, plot, and commentator name. The metadata for the mixed content may also include a cumulative rating score for the commentator in the mixed content. The metadata for the mixed content may also include a link to the user-actor's profile, for example.

Figure 7:
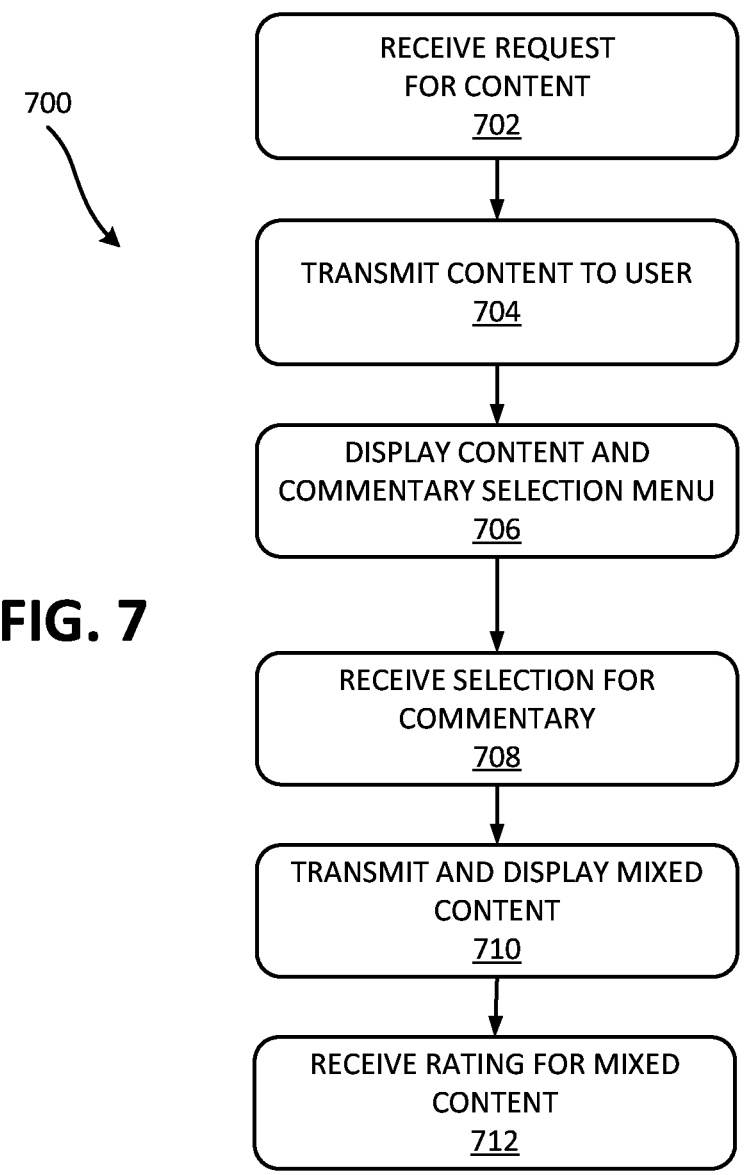
FIG. 7 is a flowchart of an exemplary process for viewing content including user commentary in a social computing environment.

The mixed content and the associated metadata may be stored (block 514) in, for example, mixed content server 214. Once stored, another user may request to view the mixed content from a mixed content catalog, as discussed above. FIG. 7 is a flowchart of a process 700 for viewing content, with the option of viewing user commentary, in a social computing environment. Process 700 may begin when commentary server 222 sends a list of content associated with user commentary to STB 256 for display on TV 102 for the user to browse. John may use remote control 258 to interact with STB 256 to play and select "Ocean's Twelve" from the list of mixed content displayed on TV 102.

Figure 8A:
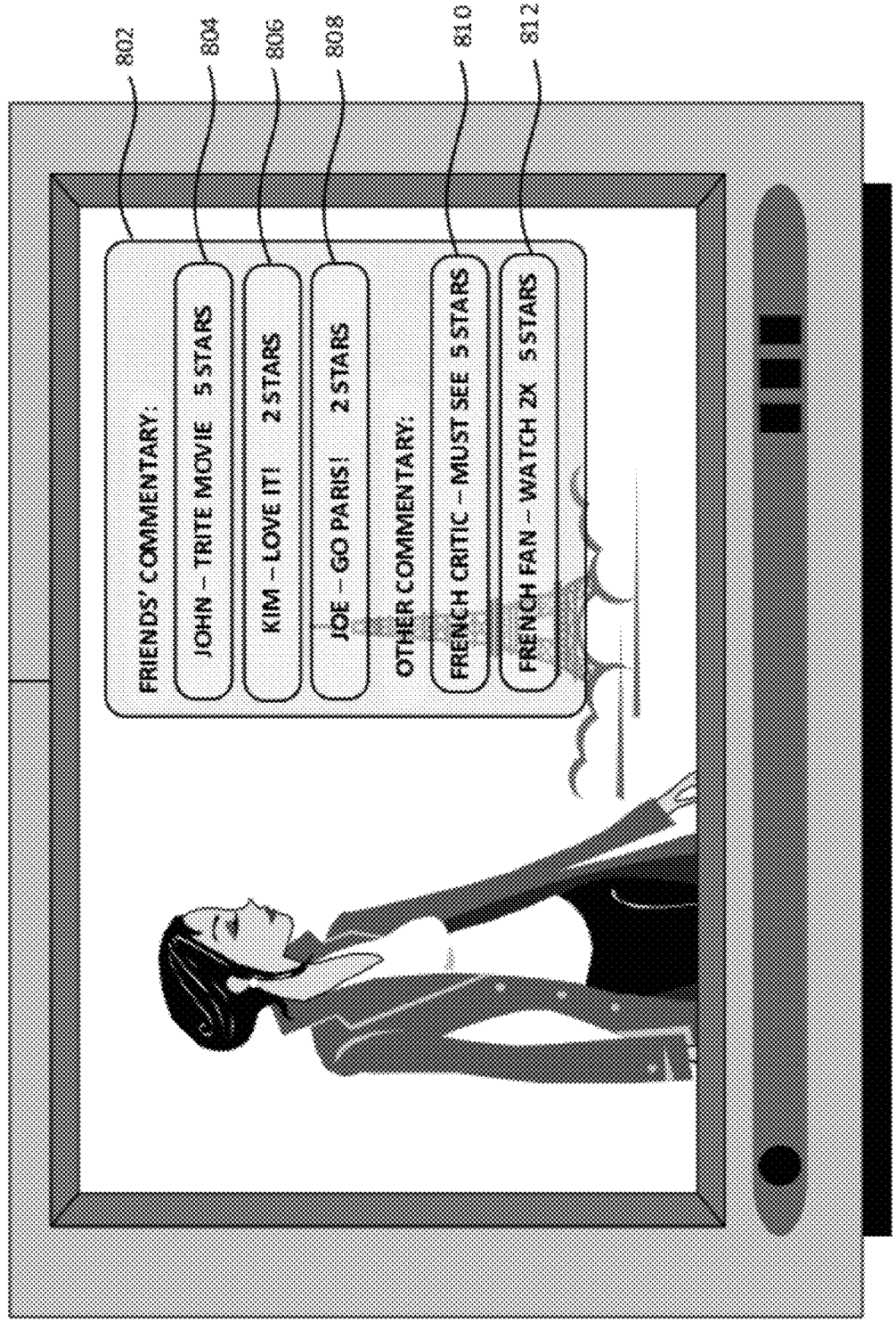
FIGS. 8A through 8D are diagrams of the television from FIG. 2 showing exemplary options for viewing content with user commentary.

The user may select "Ocean's Twelve" using remote control 258, for example. Commentary server 222 receives the request for content (block 702) and the content may be transmitted to the user (block 704). The content may be displayed with, in one embodiment, a commentary selection menu (block 706). For example, as shown in FIG. 8A, the original content 104-2 is displayed on TV 102. Commentary server 222 may also present an interactive widget 802 to the user, e.g., at any time during playback of original content 104-1. Widget 802 may list available commentaries from different users. For example, widget 802 lists both Mary's friends' commentaries and other commentaries. The list of Mary's friends may be generated from her profile stored in social server 216. Mary's friends' commentaries include the commentary from John (button 804) (recorded in process 500 above), a commentary from Kim (button 806), and a commentary from Joe (button 808). Widget 802 lists a commentary from French Critic (button 810) and a commentary from French Fan (button 812). In one embodiment, commentaries may be listed in order of rating by other users who have watched those commentaries.

Figure 8B:
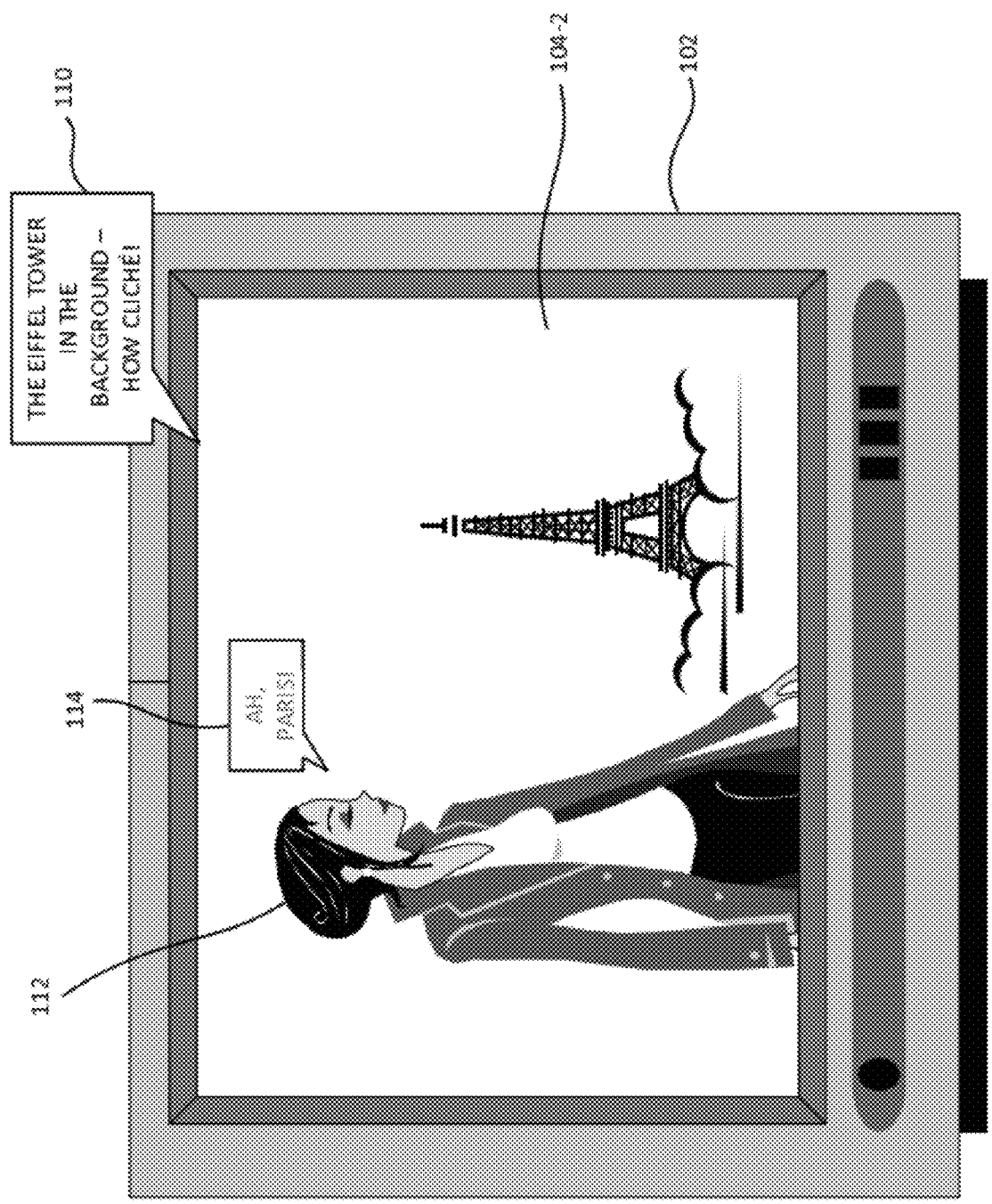

A selection for the user commentary may be received (block 708) by commentary server 222. In the current example, Mary may use remote 258 to select button 804 for John's commentary. Commentary server 222 may receive the selection for the mixed content and transmit the mixed content to STB 256 for display on TV 102. In one embodiment, the user-generated commentary is transmitted separately from the original content and mixed at STB 256, for example. FIG. 8B shows TV 102 displaying the original content with John's commentary (e.g., mixed content 104-2), as requested by Mary.

Figure 8C:
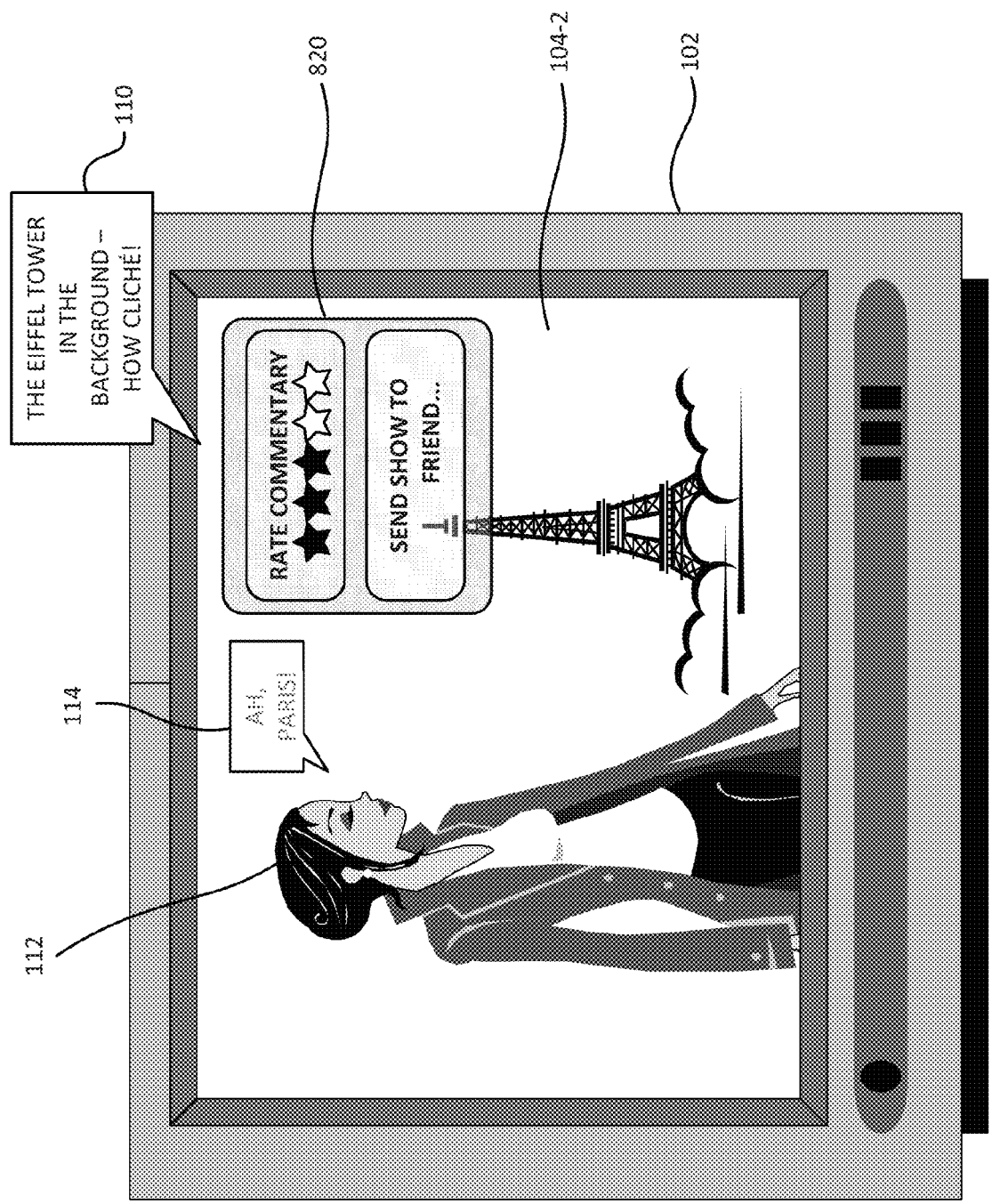

As shown in FIG. 8C, a widget 820 may allow the user to rate the actor in the mixed content. The rating, in this example, may be transmitted to commentary server 222, which may store the ratings from multiple users with the metadata associated with the mixed content. Widget 820 may also allow the user to share the mixed content with a friend from a contact list. The contact list may be stored in and associated with the user profile in social server 216.

Figure 8D:
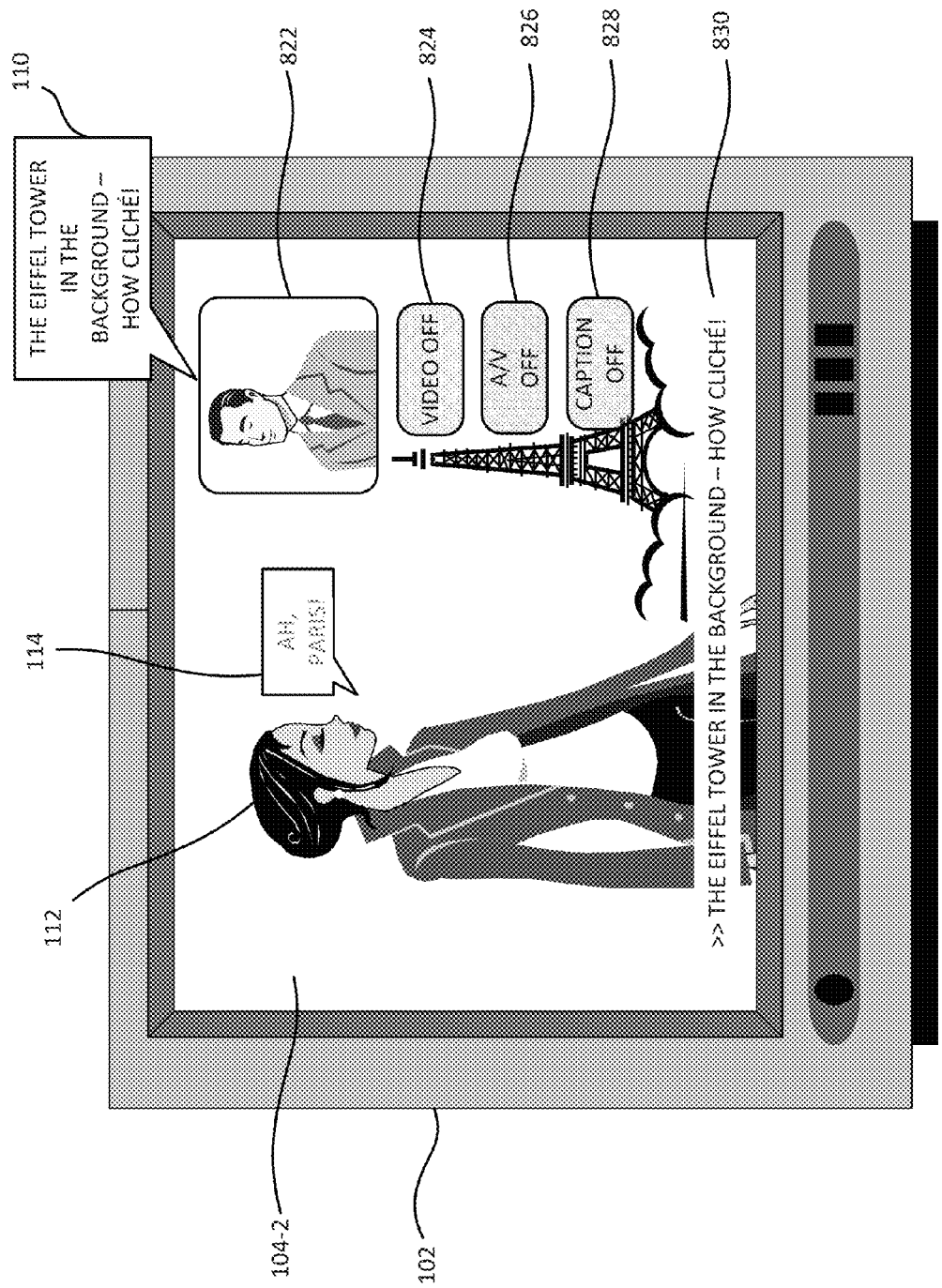

In one embodiment, in addition to capturing audio of a user, images and/or video may be captured. In this embodiment, the image and/or video of the commentator may be included in a picture-in-picture on TV 102. For example, FIG. 8D is a diagram of another exemplary embodiment. As shown, mixed content 104-2 includes a PIP video 822 of user John 106 providing commentary 110. Mixed content 104-2 may also include a video-off widget 824 so that the viewer of mixed content 104-2 on TV 102 may turn off PIP video 822 and listen to just audio commentary 110. Mixed content 104-2 may also include an audio-off widget 826 so that the viewer may turn off audio commentary 110. In one embodiment, the user may watch PIP video 822 without any commentary, for example, when PIP video includes a sign-language translation.

FIG. 8D also shows a closed-captioning text 830 that includes a transcript of commentary 110. In one embodiment, the user (e.g., John 106) may upload the transcribed text of commentary 110. In another embodiment, commentary server 222 may use a speech-to-text engine to generate text from commentary 110. As shown on TV 102, mixed content 104-2 may include a caption-off widget 828 for the user to turn closed captioning off.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

In one embodiment, the selection of original content may be displayed (e.g., in a list) based on the ratings of commentary (e.g., user generated content) associated with the original content.

As used herein, the term "content" refers to any type of content, such as TV programs, movies, interactive games, audio content, radio content, etc. While series of blocks have been described above with respect to different processes, the order of the blocks may differ in other implementations. Moreover, non-dependent acts may be performed in parallel.

It will be apparent that aspects of the embodiments, as described above, may be implemented in many different forms of software, firmware, and hardware in the embodiments illustrated in the figures. The actual software code or specialized control hardware used to implement these embodiments is not limiting of the invention. Thus, the operation and behavior of the embodiments of the invention were described without reference to the specific software code—it being understood that software and control hardware may be designed to the embodiments based on the description herein.

Further, certain portions of the invention may be implemented as logic that performs one or more functions. This logic may include hardware, such as an application specific integrated circuit, a field programmable gate array, a processor, or a microprocessor, or a combination of hardware and software.

No element, act, or instruction used in the description of the present application should be construed as critical or essential to the invention unless explicitly described as such. Also, as used herein, the articles "a" and the term "one of" are intended to include one or more items. Further, the phrase "based on" is intended to mean "based, at least in part, on" unless explicitly stated otherwise.

What is claimed is:

1. A computer-implemented method comprising:
    displaying, via a user device, a list of content on a display;
    receiving a selection, from a user of the user device, for a first content from the list, the first content including a first video content and a first audio content;
    receiving, from the user via the user device, additional audio content associated with the first content;
    providing, to a remote server device, the additional audio content;
    requesting, by the remote server device responsive to receiving the additional audio content, user input indicating:
        the additional audio content that is user-supplied commentary to supplement a corresponding first portion of the first content, and
        the additional audio content that is user-read script to be substituted for a corresponding second portion of the first content;
    storing at the remote server device:
        first metadata that links the user-supplied commentary in the additional audio content to the first portion of the first content, and
        second metadata that includes timing information for substituting the user-read script for the second portion of the first content;
    receiving, from the remote server device, mixed content generated using the first and second metadata and including the first content supplemented by the user-supplied commentary and substituted for the user-read script, included in the additional audio content;
    playing the mixed content to present the first content synchronized with the additional audio content;
    displaying a list of additional users on the display, wherein each of the additional users is associated in a database with the user; and
    receiving a selection, from the user, of one of the additional users, for recommendation of the mixed content by the user to the selected additional user.

2. The computer-implemented method of claim 1, further comprising:
    inserting user-supplied commentary in a voice-over audio track in the mixed content.

3. The computer-implemented method of claim 1, wherein the additional audio content is associated with additional video content, and
    wherein playing the mixed content to present the first content synchronized with the additional audio content includes displaying the additional video content in a picture-in-picture in the first video content.

4. The computer-implemented method of claim 3, wherein the additional video content includes video of a person speaking the additional audio content.

5. The computer-implemented method of claim 1, further comprising:
    displaying a widget to receive a rating of the additional audio content from the user;
    receiving the rating of the additional audio content from the user; and
    transmitting the rating to the remote server for aggregating ratings associated with the additional audio content.

6. The computer-implemented method of claim 1, further comprising:
    generating the first and second metadata.

7. The computer-implemented method of claim 1, further comprising:
    playing the first content; and
    receiving, from the user, the additional audio content recorded by the user during playing of the first content.

8. The computer-implemented method of claim 1, further comprising:
    requesting, by the remote server device, user input indicating a desired volume level for the first audio content.

9. A computer-implemented method comprising:
    transmitting, to a user device, a list of content for display to a user;
    receiving, from the user device, a selection by the user from the list of content for a first content including a first video content and a first audio content;
    receiving, from one or more other user devices, a plurality of additional audio content recorded during playing of the first content;
    storing each additional audio content synchronized with the first content as a plurality of mixed content, wherein each mixed content includes the first content and one of the additional audio content;
    receiving, from the user device, audio content generated by the user and associated with the first content;
    requesting, responsive to receiving the user-generated audio content, user input indicating:
        the user-generated audio content that is user-supplied commentary to supplement a corresponding first portion of the first content, and
        the user-generated audio content that is user-read script to be substituted for a corresponding second portion of the first content;

generating and storing:
  first metadata that links the user-generated audio content to the first portion of the first content, and
  second metadata that includes timing information for substituting the user-read script for the second portion of the first content;
inserting, using the first and second metadata, the user-generated audio content into the first content to create additional mixed content for playing simultaneously the first video content and the first audio content supplemented by the user-supplied commentary and substituted for the user-read script, included in the user-generated audio content;
transmitting a list of additional users to the user device for display, wherein each of the additional users is associated in a database with the user as a friend or contact; and
receiving, from the user device, a selection, from the user, of one of the additional users, for a recommendation of the additional mixed content by the user to the selected additional user.

10. The computer-implemented method of claim 9, further comprising:
including a listing of the additional mixed content in a catalog of the plurality of mixed content.

11. The computer-implemented method of claim 10, further comprising:
receiving, from the user device, the timing information.

12. The computer-implemented method of claim 11, further comprising:
displaying the catalog of the mixed content on the display, wherein displaying the catalog includes displaying a rating of each of the plurality of additional audio content.

13. A system comprising:
a user device comprising:
  a video and audio output interface to output a list of content for display to a user;
  a receiver to receive, from the user, a selection for a first content from the list, wherein the first content includes a first video content and a first audio content,
  wherein the video and audio output interface outputs a menu of a plurality of additional audio content for display, wherein the menu is based on ratings provided by users of each of the plurality of additional audio content,
  wherein the receiver is configured to receive audio content generated by the user,
  wherein the video and audio output interface is configured to present, responsive to receiving the user-generated audio content, a request to the user for an indication of:
    the user-generated audio content that is user-supplied commentary to supplement a corresponding first portion of the first content, and
    the user-generated audio content that is user-read script to be substituted for a corresponding second portion of the first content;
  wherein the receiver is configured to receive, responsive to the request, the indication of the user-generated audio content that is the user-supplied commentary to supplement the first content and the user-generated audio content that is user-read script to be substituted for the first content;
  wherein the video and audio output interface is configured to output, according to the indication, particular mixed content including the first content synchronized with the user-generated audio content for displaying simultaneously and to output a list of additional users for display, wherein each of the additional users is associated in a database with the user,
  wherein the receiver is configured to receive a selection, from the user, of one of the additional users, wherein the selection of the selected additional user indicates a recommendation of the particular mixed content by the user to the selected additional user; and
a network device comprising:
  mixing logic to mix the first content and the plurality of additional audio content to generate a plurality of mixed content, including the particular mixed content that includes the first content and user-generated audio content, and
  storage for the plurality of mixed content and a catalog of the plurality of mixed content.

14. The system of claim 13, further comprising:
a display for displaying video from the output interface; and
speakers for sounding audio from the output interface.

15. The system of claim 14, further comprising:
a microphone for receiving, from the user, the user-generated audio content recorded by the user during playing of the first content.

16. The system of claim 13, further comprising:
the network device further comprising:
  a transmitter to transmit, to a user device, the list of content for display and the menu of the plurality of additional audio content for display, wherein the menu of the plurality of additional audio content includes a rating for each of the plurality of additional audio content; and
  a receiver to receive, from the user device, the selection from the list of content for the first content and the selection from the menu of the plurality of additional audio content.

17. The system of claim 16, further comprising:
a processor to aggregate the ratings provided by users of each of the plurality of additional audio content and to generate the rating for each of the plurality of additional audio content.

18. The system of claim 13, the video and audio output interface being further configured to:
present, responsive to the received indication, a request for user input indicating a desired volume level for the first audio content.

19. A computer-implemented method comprising:
storing a first database of users and a list of additional users associated with a first user;
storing a second database of video content and associated audio content, wherein each video content and associated audio content is associated with additional audio content recorded by one of the users during playing of the corresponding video content and associated audio content;
receiving, from a first user device associated with a first user, a selection, by the first user, of a second user, wherein the second user is associated with the first user in the first database of users, and wherein the selection of the second user initiates an invitation from the first user to the second user to join a commentary session regarding a first video content and associated first audio content;
receiving, from the first user device during the commentary session, first additional audio content recorded by the first user and the second user during playing of the first video content and the associated first audio content;

requesting, responsive to receiving the first additional audio content, user input indicating:
- the first additional audio content that is user-supplied commentary to supplement a corresponding first portion of the associated first audio content, and
- the first additional audio content that is user-read script to be substituted for a corresponding second portion of the associated first audio content;

receiving, from at least one of the first user or the second user and in response to the requesting, an indication of the first additional audio content that is user-supplied commentary to supplement the associated first audio content and the first additional audio content that is user-read script to be substituted for the associated first audio content;

mixing, responsive to receiving the indication, the first video content and the first additional audio content with the first video content and the associated first audio content to create corresponding mixed content;

storing, in a third database of mixed content, the corresponding mixed content for later distribution;

receiving, from other user devices for each video content and associated audio content, ratings of the corresponding mixed content; and generating a menu of additional audio content based on the ratings of each of the corresponding mixed content.

20. The computer-implemented method of claim 19, further comprising:
- transmitting the menu of additional audio content to a user device;
- receiving a selection of an additional audio content; and
- transmitting the corresponding mixed content.

21. The computer-implemented method of claim 20, further comprising:
- playing the corresponding mixed content.

22. The computer-implemented method of claim 19, the method further comprising:
- presenting, responsive to the received indication, a request for user input indicating a desired volume level for the associated first audio content.

\* \* \* \* \*